United States Patent
Ross

(10) Patent No.: US 10,587,522 B2
(45) Date of Patent: *Mar. 10, 2020

(54) DATA-CONNECTION AGGREGATION

(71) Applicant: Vivint, Inc., Provo, UT (US)

(72) Inventor: Kevin Ross, Saratoga Springs, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,528

(22) Filed: Dec. 19, 2017

(65) Prior Publication Data

US 2018/0183716 A1 Jun. 28, 2018

Related U.S. Application Data

(63) Continuation of application No. 14/852,222, filed on Sep. 11, 2015, now Pat. No. 9,860,179, which is a continuation-in-part of application No. 14/522,489, filed on Oct. 23, 2014, now Pat. No. 9,621,465.

(51) Int. Cl.
| | |
|---|---|
| *H04W 12/00* | (2009.01) |
| *H04L 12/815* | (2013.01) |
| *H04L 29/06* | (2006.01) |
| *H04W 28/06* | (2009.01) |
| *H04L 12/801* | (2013.01) |
| *H04L 12/707* | (2013.01) |

(52) U.S. Cl.
CPC .............. *H04L 47/22* (2013.01); *H04L 63/18* (2013.01); *H04W 12/00* (2013.01); *H04W 28/065* (2013.01); *H04L 45/24* (2013.01); *H04L 47/12* (2013.01)

(58) Field of Classification Search
CPC ........ H04L 47/22; H04L 63/18; H04W 12/00; H04W 28/065
USPC ........................................................... 370/235
See application file for complete search history.

(56) References Cited

U.S. PATENT DOCUMENTS

| | | | |
|---|---|---|---|
| 7,590,055 B2 | 9/2009 | Segel | |
| 7,805,156 B1 | 9/2010 | Allen et al. | |
| 8,369,349 B2 | 2/2013 | Martinez et al. | |
| 8,385,224 B2 | 2/2013 | Pasko | |
| 8,514,701 B2 | 8/2013 | Kalla et al. | |
| 8,737,221 B1 * | 5/2014 | Jilani | H04L 47/2416 370/235 |
| 8,788,640 B1 | 7/2014 | Masters | |
| 8,989,010 B2 | 3/2015 | Beheshti-Zavareh et al. | |
| 9,792,308 B2 * | 10/2017 | Fallon | G06F 16/22 |
| 9,922,347 B1 * | 3/2018 | Burcham | G06Q 30/0267 |
| 2004/0037321 A1 | 2/2004 | Miura | |

(Continued)

OTHER PUBLICATIONS

PCT International Search Report for International Application No. PCT/US2015/056924, dated Feb. 1, 2016 (3 pp.).

*Primary Examiner* — Sai Ming Chan
(74) *Attorney, Agent, or Firm* — Holland & Hart LLP

(57) ABSTRACT

A method for security and/or automation systems is disclosed. The method may include identifying data being transmitted over a wired data-connection and parsing the identified data into two or more parts. The method may additionally include transmitting a first part of the identified data over a primary wireless data-connection and transmitting a second part of the identified data over an auxiliary wireless data-connection connected to the primary wireless data-connection via a wireless data-connection.

20 Claims, 8 Drawing Sheets

(56) References Cited

U.S. PATENT DOCUMENTS

| | | |
|---|---|---|
| 2006/0039291 A1 | 2/2006 | Sinha et al. |
| 2006/0165009 A1* | 7/2006 | Nguyen ............... H04L 12/2854 370/252 |
| 2008/0037478 A1 | 2/2008 | Na et al. |
| 2008/0133996 A1 | 6/2008 | Naka et al. |
| 2010/0241759 A1* | 9/2010 | Smith .................... H04L 47/10 709/233 |
| 2010/0293277 A1 | 11/2010 | Rooks et al. |
| 2013/0111038 A1 | 5/2013 | Girard |
| 2013/0286941 A1 | 10/2013 | Lee et al. |
| 2014/0086256 A1 | 3/2014 | Raniere |
| 2014/0154973 A1 | 6/2014 | Schoppmeier |
| 2014/0161055 A1 | 6/2014 | Chitrapu et al. |
| 2014/0269461 A1* | 9/2014 | Mehta ....................... H04L 5/06 370/297 |
| 2015/0312337 A1* | 10/2015 | Keremane ........... H04L 67/1095 709/217 |

* cited by examiner

DATA-CONNECTION AGGREGATION

CROSS-REFERENCE TO RELATED APPLICATIONS

The present application is a continuation of U.S. patent application Ser. No. 14/852,222, filed Sep. 11, 2015, titled "DATA-CONNECTION AGGREGATION," which is a continuation-in-part of U.S. patent application Ser. No. 14/522,489, filed Oct. 23, 2014, titled "WIRED DATA-CONNECTION AGGREGATION," and assigned to the assignee hereof, the disclosures of which are expressly incorporated herein in their entireties by this reference.

BACKGROUND

The present disclosure, for example, relates to security and/or automation systems, and more particularly to aggregate data connections to improve data transfer speeds.

Security and automation systems are widely deployed to provide various types of communication and functional features such as monitoring, communication, notification, and/or others. These systems may be capable of supporting communication with a user through a communication connection or a system management action.

Many homes and businesses use one or more computer networks to generate, deliver, and receive data and information between the various computers connected to computer networks. Users of computer technologies continue to demand increased access to information and an increase in the efficiency of these technologies. When transferring large files or large quantities or sizes of data, internet connections may time out or may take an excessive amount of time to complete.

SUMMARY

Multiple data connections may be aggregated to increase the capacity of transferring data. All data-connections have capacity limitations. With the advance of technology has come an increase in the size of data being transmitted. When transmitting one or multiple instances of these large files, a user may experience latency or lagging. In some instances, a user may be transmitting more data than a data connection may transmit at a single time. This may result in delays in transmission, latency, and/or lagging. To overcome these delays, a data mesh may overlay multiple data-connections to increase the speed of data transfer.

In one embodiment, a method for security and/or automation systems is disclosed. The method may include identifying data being transmitted over a wired data-connection and parsing the identified data into two or more parts. The method may additionally include transmitting a first part of the identified data over a primary wireless data-connection and transmitting a second part of the identified data over an auxiliary wireless data-connection connected to the primary wireless data-connection via a wireless data-connection.

The method may additionally include aggregating the two or more parts of the identified data after transmitting the two or more parts to an end destination. The method may include determining when the identified data exceeds a capacity of the primary wireless data-connection. The primary wireless data-connection may be at a primary location and the auxiliary wireless data-connection is at a secondary location. The method may include coupling, using one or more wireless data-connections, one or more auxiliary wireless data-connections to the primary data-connection, wherein the one or more auxiliary wireless data-connections are located at one or more secondary locations.

In some embodiments, the method may include identifying more than one piece of data being transferred across the primary wireless data-connection and prioritizing data from the primary location over data from the secondary location based at least in part on the identifying. The method may include redirecting the second part of the identified data to a second auxiliary wireless data-connection based at least in part on the prioritizing. The method may include aggregating two or more wireless data-connections over a wireless data system.

In some embodiments, a part of the identified data may be retransmitted if not received by an end destination. In some embodiments, a size of the identified data may be compared to a bandwidth of the primary wireless data-connection and a transfer time estimate of transmitting the identified data over the primary wireless data-connection may be calculated based at least in part on the comparing. The identified data may be divided into the two or more parts based at least in part on the calculating. Transmitting the second part of the identified data over the auxiliary wireless data-connection may reduce the calculated transfer time estimate value.

In another embodiment, an apparatus for security and/or automation systems is disclosed. The apparatus may include a processor, memory in electronic communication with the processor, and instructions stored in the memory. The instructions may be executable by the processor to identify data being transmitted over a wired data-connection, parse the identified data into two or more parts, transmit a first part of the identified data over a primary wireless data-connection, and transmit a second part of the identified data over an auxiliary wireless data-connection connected to the primary wireless data-connection via a wireless data-connection.

In a further embodiment, a non-transitory computer-readable medium storing computer-executable code may be disclosed. The code may be executable by a processor to identify data being transmitted over a wired data-connection, parse the identified data into two or more parts, transmit a first part of the identified data over a primary wireless data-connection, and transmit a second part of the identified data over an auxiliary wireless data-connection connected to the primary wireless data-connection via a wireless data-connection.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to transferring data. More specifically, the systems and methods described herein relate to latency in transmitting data over a data-connection. For example, a wireless mesh or network may overlay several wired and/or wireless data-connections in a load sharing or bonding capacity for improved data transfer performance and redundancy.

Multiple data connections may be aggregated to increase the capacity of transferring data. All data-connections have capacity limitations. Wired data-connections may comprise Ethernet, digital subscriber line (DSL), telephone lines, coaxial cables, fiber optic networks, and the like. DSL may transmit from 256 Kbits per second to over 100 Mbit per second. Ethernet may transmit approximately 100 gigabits per second. Wireless data-connections may include wireless personal area networks, wireless local area network, wireless mesh network, wireless metropolitan area networks, wireless wide area networks, cellular networks, mobile networks, global area network, space network, and the like. However, with the advance of technology has come an increase in the size of data being transmitted. Electronic books can range in size from 1 to 5 megabits. An HD movie can be approximately 8-15 gigabits; a Blu-ray movie can be 20-25 gigabits. An MP3 file can comprise 4 megabits. Image file sizes may range over 1 megabit depending on the quality of the image. Software packages may range from small, such as approximately 1 Megabit, to quite large, over 400 Megabit. When transmitting one or multiple instances of these large files, a user may experience latency or lagging. In some instances, a user may be transmitting more data than a data-connection may transmit at a single time. This may result in delays in transmission, latency, and/or lagging.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
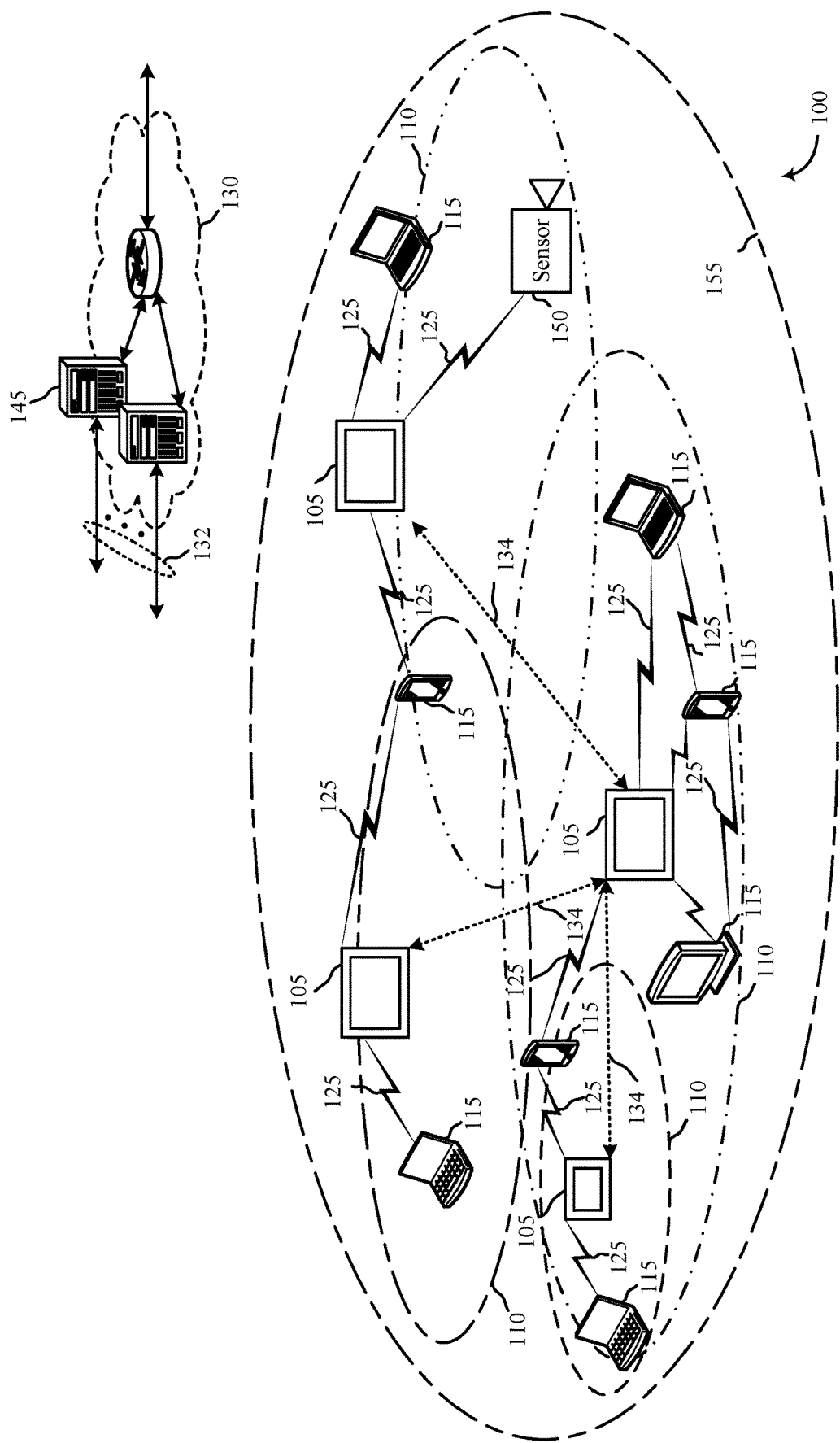
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, sensors 150, and/or a mesh network 155. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communicate with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 125. Two or more devices 115 may communicate via a direct communication link 125 when both devices 115 are in the geographic coverage area 110 or when one or neither devices 115 is within the geographic coverage area 110. Examples of direct communication links 125 may include Wi-Fi Direct, BLUETOOTH®, wired, and/or, and other P2P group connections. The devices 115 in these examples communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, a mesh network 155 may overlay the communications system 100. The mesh network 155 may connect one or more geographic coverage area 110. For example, each geographic coverage area 110 may represent a different physical location. The physical locations may be representative of a business, residence, or the like. The mesh network may include any combination of wireless and/or wired connections. The mesh network 155 may comprise a wireless personal area network (WPAN), a wireless local area network (WLAN), a wireless mesh network, a wireless metropolitan area network, a wireless wide area network, wireless links, cellular networks, global area network, Bluetooth, Ethernet, digital subscriber line (DSL), telephone lines, coaxial cables, fiber optic networks, and the like. If a geographic coverage area 110 is transferring, either incoming or outgoing, large quantities of data may consume the available bandwidth of a communication link 132. To alleviate and increase the speed of the transfer, the mesh network 155 may divvy up the data being transferred to alternate geographic coverage areas 110. For example, if a user is attempting to transfer large quantities of data to the network 130, the data may be divvied up and be transferred to the network 130 using multiple communication links 132 of surrounding geographic coverage areas 110. The mesh network 155 may facilitate the transferring of data from one geographic coverage area 110 to another geographic coverage area 110. Once the data reaches the network 130, the data may be recompiled into its original state. This process may additionally work in reverse if a large quantity of data is being sent to a geographic coverage area 110, the network 130 may divvy the data into two or more pieces and transfer it to multiple geographic coverage areas 110. The mesh network 155 may transfer all the various pieces of data to the end destination and recompile the data.

Figure 2:
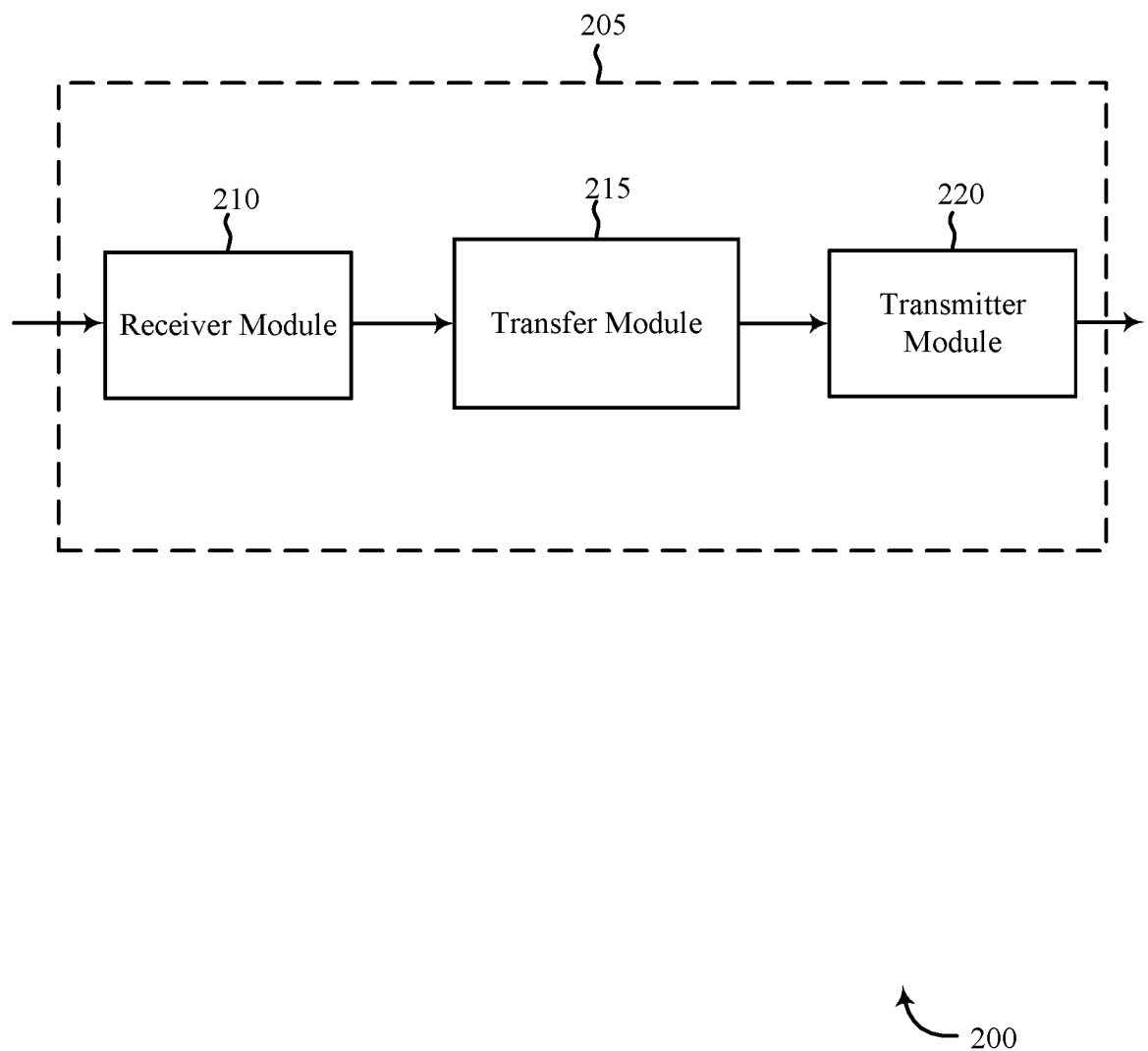
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. In some embodiments, the apparatus 205 may be an example of one or more aspects of a control panel 105 or device 115 described with reference to FIG. 1. The apparatus 205 may include a receiver module 210, a transfer module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive parsed data from one or more sources, information on open nearby data-connections, and the like. Information may be passed on to the transfer module 215, and to other components of the apparatus 205.

The transfer module 215 may transmit data between two locations, between multiple locations, or the like. Data may comprise raw data, files, software packages, multiple pieces of data, and the like. In some embodiments, the location may comprise a home location, a business location, a server, and the like. The transfer module 215 may transfer files over wireless and/or wired data-connection. The data-connections may be one or more of a telephone line, DSL, coaxial cable, fiber optic network, wireless personal area networks, wireless local area network, wireless mesh network, wireless metropolitan area networks, and the like as described previously. In some embodiments, the data-connection may have a maximum transfer capacity. For example, different data-connections may have different transfer rates. The transfer rates may be expressed in bits per second. The bits per second may determine how quickly a file may be transferred based on the type of connection. In some instances, the file may be too large for a particular connection and may cause latency, a connection time-out, and/or a lengthy transfer time.

To effectuate an improved data transfer experience, the transfer module 110 may parse the data being transferred. For example, the transfer module 110 may divide the data into two or more smaller sized parts and transfer the smaller parts. After the smaller parts are transferred to their end destination, the data may be recompiled or aggregated back into its original state. The transfer module 110 may transfer the data over multiple wired data-connections. For example, the transfer module 110 may couple multiple wired data-connections over a mesh network. The mesh network may be a wireless network.

The transmitter module 220 may transmit the one or more signals received from other components of the apparatus 205. The transmitter module 220 may transmit parsed data, open data-connection information, and the like. In some examples, the transmitter module 220 may be collocated with the receiver module 210 in a transceiver module.

Figure 3:
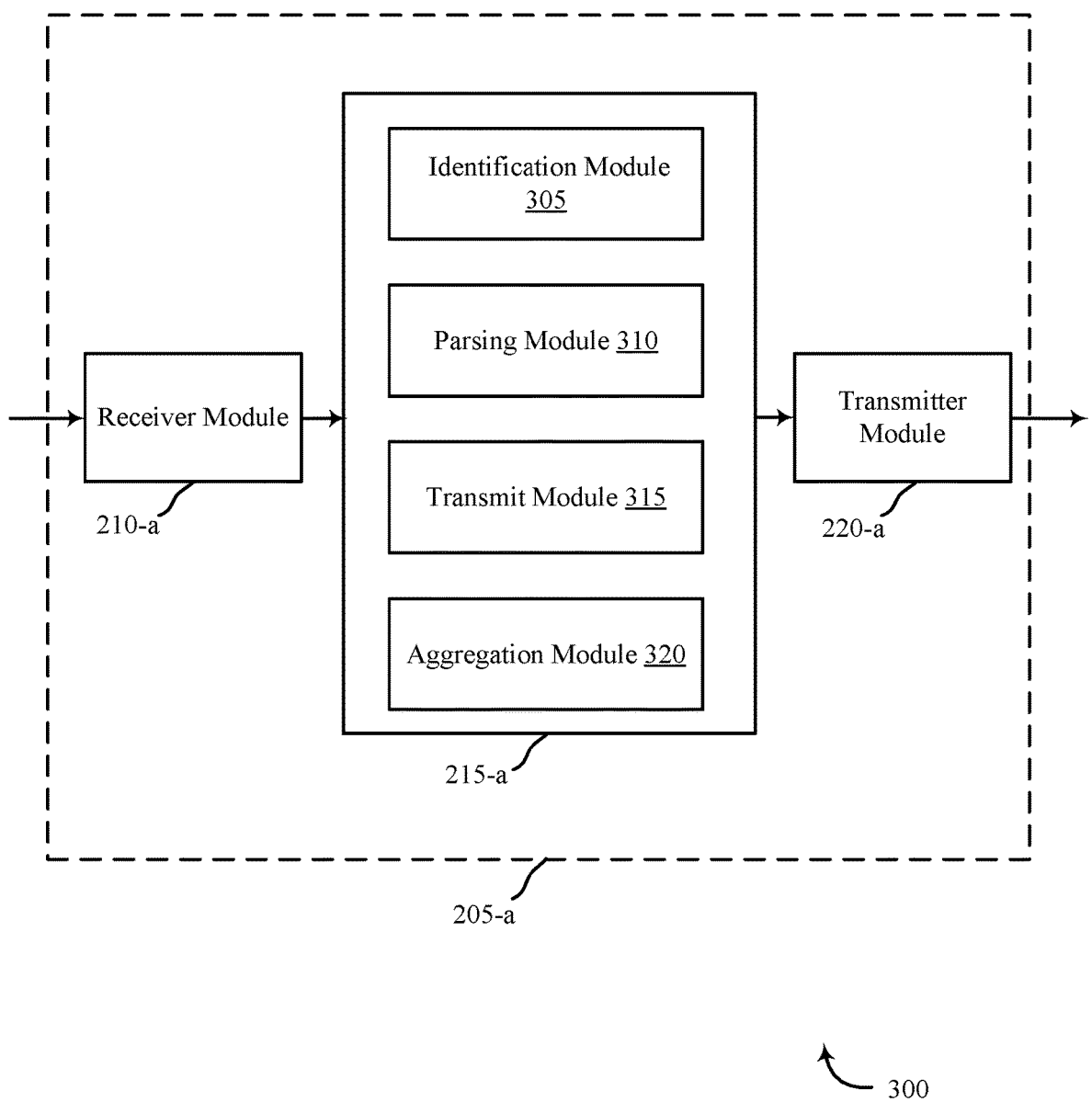
FIG. 3 shows a block diagram of a device relating to a security and/or an automation system, in accordance with various aspects of this disclosure.

FIG. 3 shows a block diagram 300 of an apparatus 205-a for use in wireless communication, in accordance with various examples. The apparatus 205-a may be an example of one or more aspects of a control panel 105 or device 115 described with reference to FIGS. 1 and/or 2. It may also be an example of an apparatus 205 described with reference to FIG. 2. The apparatus 205-a may include a receiver module 210-a, a transfer module 215-a, and/or a transmitter module 220-a, which may be examples of the corresponding modules of apparatus 205. The apparatus 205-a may also include a processor. Each of these components may be in communication with each other. The transfer module 215-a may include an identification module 305, a parsing module 310, a transmit module 315, and an aggregation module 320. The receiver module 210-a and the transmitter module 220-a may perform the functions of the receiver module 210 and the transmitter module 220, of FIG. 2, respectively.

In some embodiments, the identification module 305 may identify data being transmitted over a wired and/or wireless data-connection. The data may be transmitted from a primary location over a primary wired and/or wireless data-connection. The identification module 305 may identify which data to parse and transfer over one or more connections. For example, the identification module 305 may identify when a large data set is attempting to be transferred between two locations based on one or more parsing factors.

The one or more parsing factors may comprise a size of the data, availability of one or more auxiliary connections, an estimated transfer time, and the like.

For example, the identification module 305 may comprise information regarding a transfer rate of the primary data-connection. The identification module 305 may compare the size of the identified data to a transfer rate and determine an estimated transfer time of the identified data. In some embodiments, the estimated transfer time may be greater than a predetermined acceptable data transfer time. In further embodiments, the estimated transfer time may cause a connection to time-out. In other embodiments, the estimated transfer time may be greater than a desirable transfer time set by a user, server, or the like.

The identification module 305 may determine the available bandwidth of the primary wired and/or wireless data-connection. For example, a user may be transferring an excessive number of files. The aggregate size of the numerous files may exceed a bandwidth of the primary data-connection. The aggregate size of the files may additionally exceed an estimated transfer time to complete the transmission of the multiple files.

The identification module 305 may also determine the availability of one or more auxiliary connections. An auxiliary connection may consist of a connection between a secondary location (e.g. geographic coverage area 110) and the network (e.g. network 130). The auxiliary connection may comprise a wired data-connection and/or a wireless data-connection. The auxiliary connections may be connected to the primary data-connection via a mesh network (e.g. mesh network 155). The identification module 305 may identify a number of auxiliary connections connected to the primary connection and may additionally determine a bandwidth availability of the one or more auxiliary connections. The bandwidth may comprise the amount of available or consumed data communication resources of the auxiliary connections. The bandwidth may be expressed in bits per second or multiples of a bits per second bandwidth.

The parsing module 310 may divide the identified data into two or more parts. For example, the parsing module 310 may split the data into subparts to decrease a transfer time of the data. If the identified data is too large, the data may be parsed into two or more smaller pieces. If the data consists of multiple pieces of data that combined exceed a bandwidth of the primary data connection, the multiple pieces of data may be divvied into multiple parts to effectuate a decreased transfer time. The parsing module 310 may consist of a code to generate a file which may reconstitute the data once transmission is complete. The code may be impregnated into one of the parsed parts or may be transmitted as a separate file.

The transmit module 315 may effectuate the physical transfer of the data. The transmit module 315 may either transmit the data between a network and a system using the primary data-connection and one or more auxiliary data-connections. Additionally, the transmit module 315 may transfer data between the system and a server using the primary connection and one or more auxiliary connections. For example, the transmit module 315 may send a part of data over the primary data-connection. The transmit module 315 may then send one or more additional parts of data over the mesh network to one or more secondary locations. The transmit module 315 may transmit the pieces of data from the one or more secondary locations to the end destination using one or more auxiliary data-connections.

If one or more pieces of data have not been received by the end location, the transmit module 315 may resend the pieces of identified data. The transmit module 315 may try to resend the data using the one or more auxiliary connections. Conversely, the transmit module 315 may resend the piece of data using the primary data-connection if the primary data-connection has bandwidth availability.

In some embodiments, while a piece of data is being transmitted using an auxiliary connection, more pieces of data originating from the secondary location may interrupt or consume unanticipated bandwidth on the auxiliary connection. The transmit module 315 may prioritize data originating from the secondary location that is being transferred on the auxiliary connection. In those embodiments, the transmit module 315 may redirect one or more pieces of data to a second auxiliary data-connection to effectuate data transfer.

The aggregation module 320 may recompile the parts of the data once the two or more pieces have reached their end destination. For example, the aggregation module 320 may receive the code and/or instructions for recompiling the data. The aggregation module 320 may use the code and/or instructions to compile the data into its original state prior to being split into multiple pieces. Once the aggregation module 320 has completed recompiling the data, the data may be presented to the end user. The end user may be a server, user, or the like.

Figure 4:
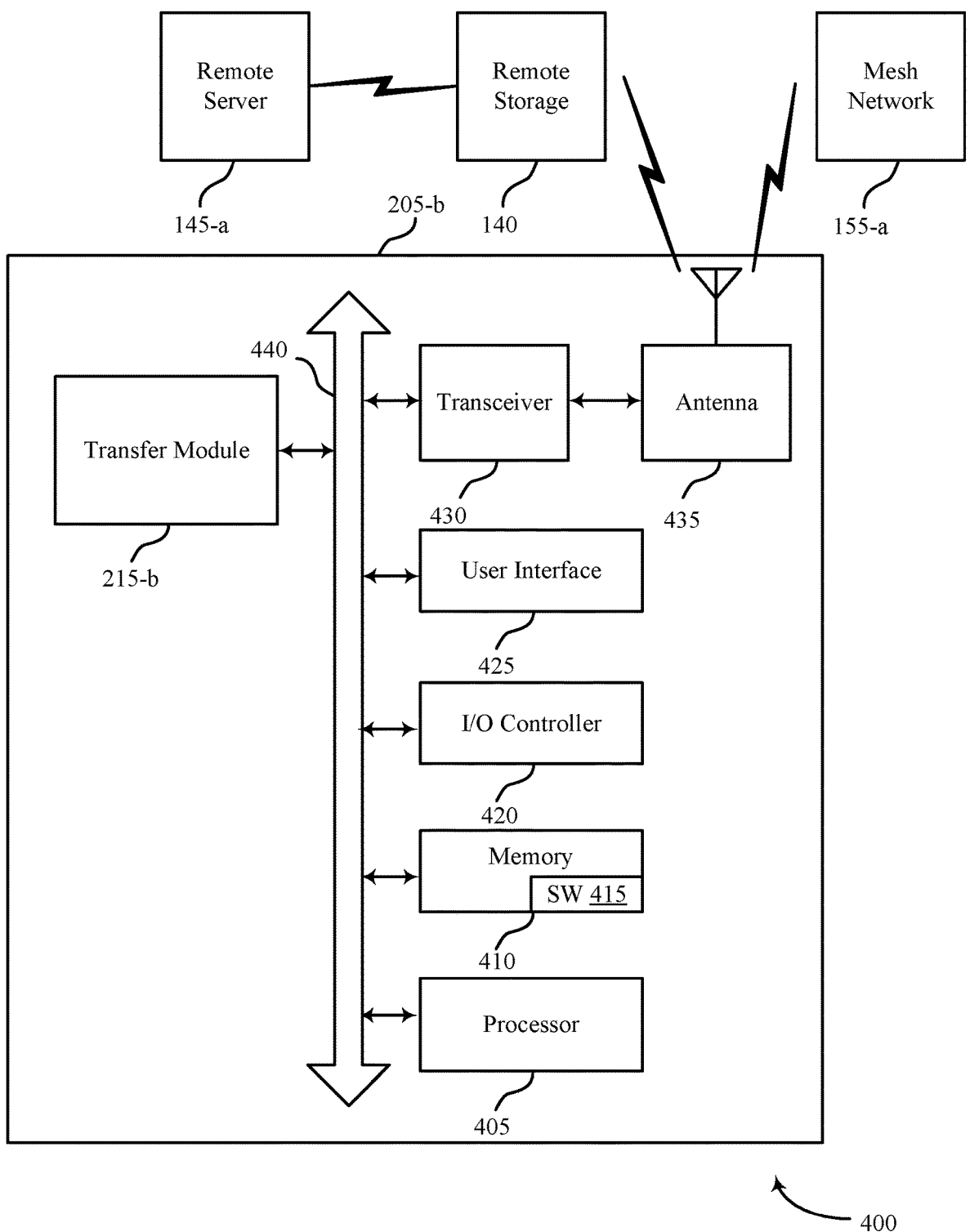
FIG. 4 shows a block diagram relating to a security and/or an automation system, in accordance with various aspects of this disclosure.

FIG. 4 shows a system 400 for use in data aggregation systems, in accordance with various examples. System 400 may include an apparatus 205-*b*, which may be an example of the control panels 105 or device 115 of FIG. 1. Apparatus 205-*b* may also be an example of one or more aspects of apparatus 205 and/or 205-*a* of FIGS. 2 and 3.

Apparatus 205-*b* may also include components for bi-directional voice and data communications including components for transmitting communications and components for receiving communications. For example, apparatus 205-*b* may communicate bi-directionally with a mesh network 155-*a*, remote storage 140, and/or remote server 145-*a*, which may be an example of the remote server of FIG. 1. This bi-directional communication may be direct (e.g., apparatus 205-*b* communicating directly with remote storage 140) or indirect (e.g., apparatus 205-*b* communicating indirectly with remote server 145-*a* through remote storage 140).

Apparatus 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of mesh network 155-*a*, remote storage 140, and/or remote server 145-*a*. The transceiver module 430 may include a modem to modulate the packets and provide the modulated packets to the one or more antennas 435 for transmission, and to demodulate packets received from the one or more antennas 435. While an apparatus (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 145-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more mesh networks 155-*a* may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., parse data, transfer data to auxiliary data-connections, aggregate data, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the transfer module 215-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions.

The apparatus 205-b may include a transfer module 215-b, which may perform the functions described above for the transfer modules 215 of apparatus 205 of FIGS. 2 and 3.

Figure 5:
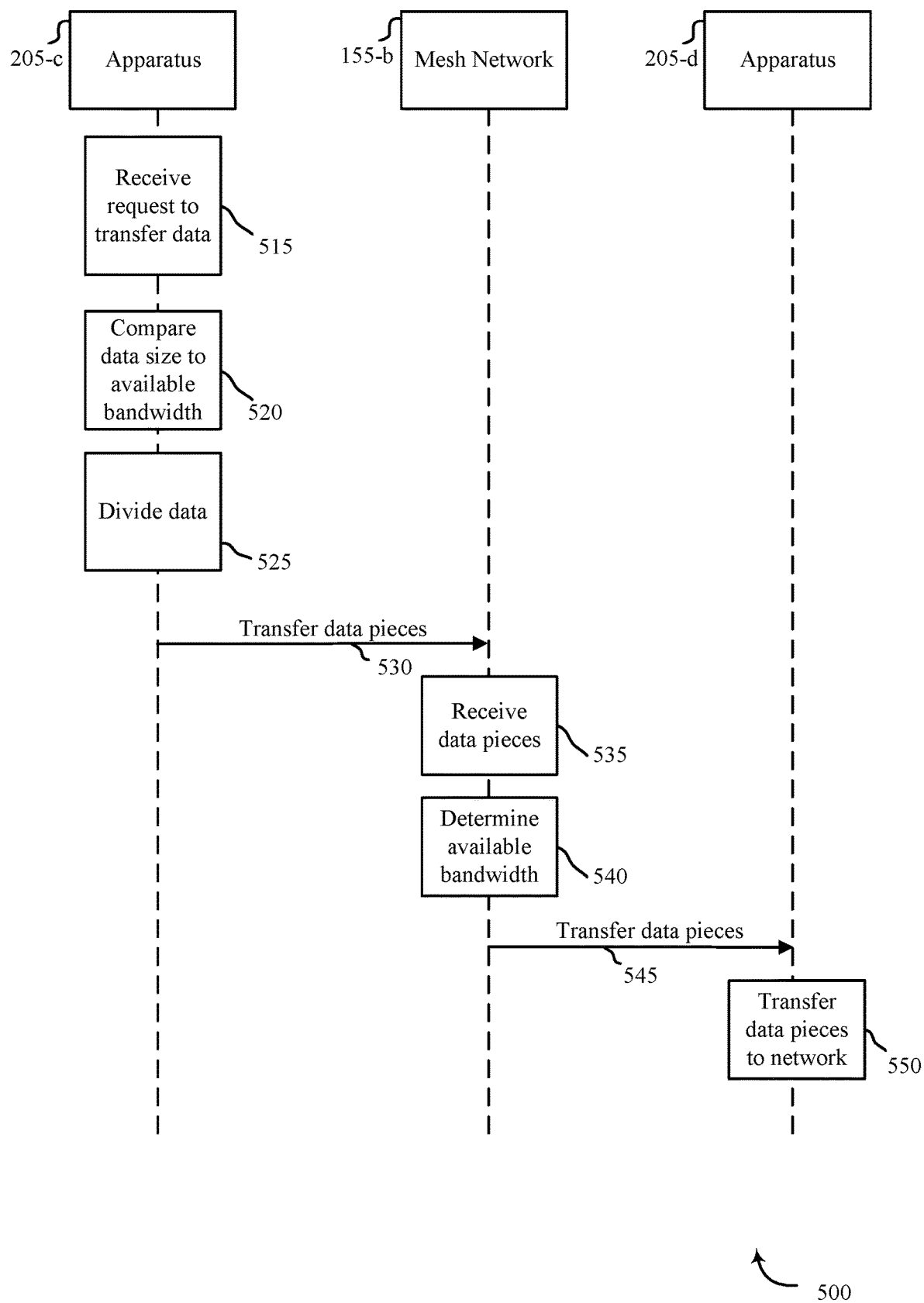
FIG. 5 shows a swim diagram of an apparatus relating to a security and/or an automation system, in accordance with various aspects of this disclosure.

FIG. 5 shows a system 500 for use in data aggregation systems, in accordance with various examples. System 500 may include an apparatus 205-c and apparatus 205-d which may be one example of the apparatus 205, 205-a, 205-b described with reference to FIGS. 2-4. The system 500 may additionally include a mesh network 155-b which may be an example of the mesh network 155, 155-a of FIGS. 1 and/or 4. The apparatus 205-c may be connected to a primary data-connection and the apparatus 205-d may be connected to an auxiliary data-connection.

At block 515, the apparatus 205-c may receive a request to transfer data. At block 520, the apparatus 205-c may compare the size of the data to the available bandwidth on the apparatus 205-c. If the data size exceeds the available bandwidth or if the size of the data may exceed a transfer time threshold, at block 525, the apparatus 205-c may divvy up the data into two or more pieces. The apparatus 205-c may then transfer 530 one or more pieces of the data to the mesh network 155-b.

The mesh network 155-b may receive the pieces of data 535 and may determine nearby auxiliary data-connections with available bandwidth 540. The mesh network 155-b may then transfer the data pieces 545 to an apparatus 205-d associated with an auxiliary data-connection. The apparatus 205-d may then transfer the data pieces to the network 550 using the auxiliary data-connection.

Figure 6:
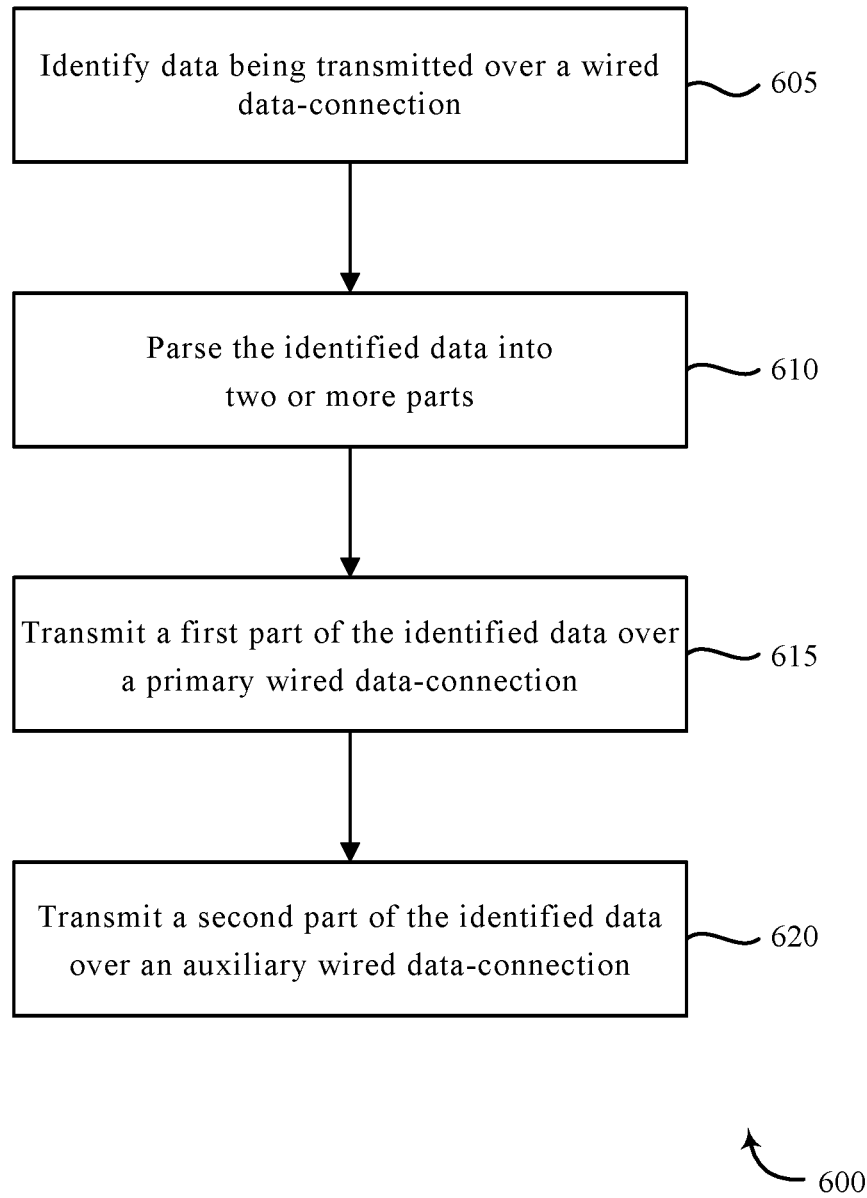
FIG. 6 is a flow chart illustrating an example of a method relating to a security and/or an automation system, in accordance with various aspects of this disclosure.

FIG. 6 is a flow chart illustrating an example of a method 600 for aggregating data over multiple data-connections, in accordance with various aspects of the present disclosure. For clarity, the method 600 is described below with reference to aspects of one or more of the transfer module 215 described with reference to FIGS. 2, 3, and/or 4. In some examples, an apparatus (e.g. apparatus 205) may execute one or more sets of codes to control the functional elements to perform the functions described below. Additionally or alternatively, the apparatus may perform one or more of the functions described below using special-purpose hardware.

At block 605, the method may include identifying data being transmitted over a wired data-connection. The data may be an individual file, a group of files, generic data and/or the like. The file may be transferred between two locations. The locations may comprise a business, home location, a server, a network, and the like. For example, the data may be transferred between a home location and a server, between two servers, between two businesses, or the like. The data may originate from a primary location and may be attempted to be transmitted over a primary wired-data connection. The data may be of a size such that it exceeds a capacity of the primary wired data-connection.

The operation(s) at block 605 may be performed using the identification module 305 described with reference to FIG. 3.

At block 610, the method may include parsing the data into two or more parts. For example, the identified data may exceed the bandwidth capacity of the primary data connection. Dividing the data into two or more pieces may result in smaller files or pieces of data which may be transmitted faster. The pieces of data may be equivalent in size. For example, the data may be halved if transmitting over two connections, trifurcated if transmitting over three lines, and the like. In other embodiments, the data may be parsed into non-equivalent pieces. For example, a first piece may be larger than a second piece, or multiple pieces may be of varying sizes depending upon the availability of auxiliary network bandwidths.

The operation(s) at block 610 may be performed using the parsing module 310 described with reference to FIG. 3.

At block 615, the method may include transmitting a first part of the identified data over a primary wired data-connection. The primary wired data-connection may connect the primary location and a network. The primary wired-data connection may additionally or alternatively connect the primary location and a server. The identified data may be transmitted between the network and the system, between the server and the system, or any other known combination. In some embodiments, the data may be sent to another location by means of the server. The first part of the identified data may consume a large portion of the bandwidth on the primary wired data-connection. In some embodiments, the data may consume any available bandwidth on the primary connection.

At block 620, the method may include transmitting a second part of the identified data over an auxiliary wired data-connection. The auxiliary wired data-connection may be connected to the primary wired data-connection via a mesh network. The mesh network may comprise wireless technology. The second part of the identified file may not consume the entire bandwidth of the auxiliary connection. Rather, the second piece of data may reduce the size of the overall data enough to allow for an effective transfer of the information over a wired-data-connection. In some embodiments, additional parsed pieces of data may continue to be transferred to auxiliary wired data-connections via the wireless mesh network.

The operation(s) at blocks 615 and 620 may be performed using the transmit module 315 described with reference to FIG. 3.

Thus, the method 600 may provide for transfer of data over multiple data-connections. It should be noted that the method 600 is just one implementation and that the operations of the method 600 may be rearranged or otherwise modified such that other implementations are possible.

Figure 7:
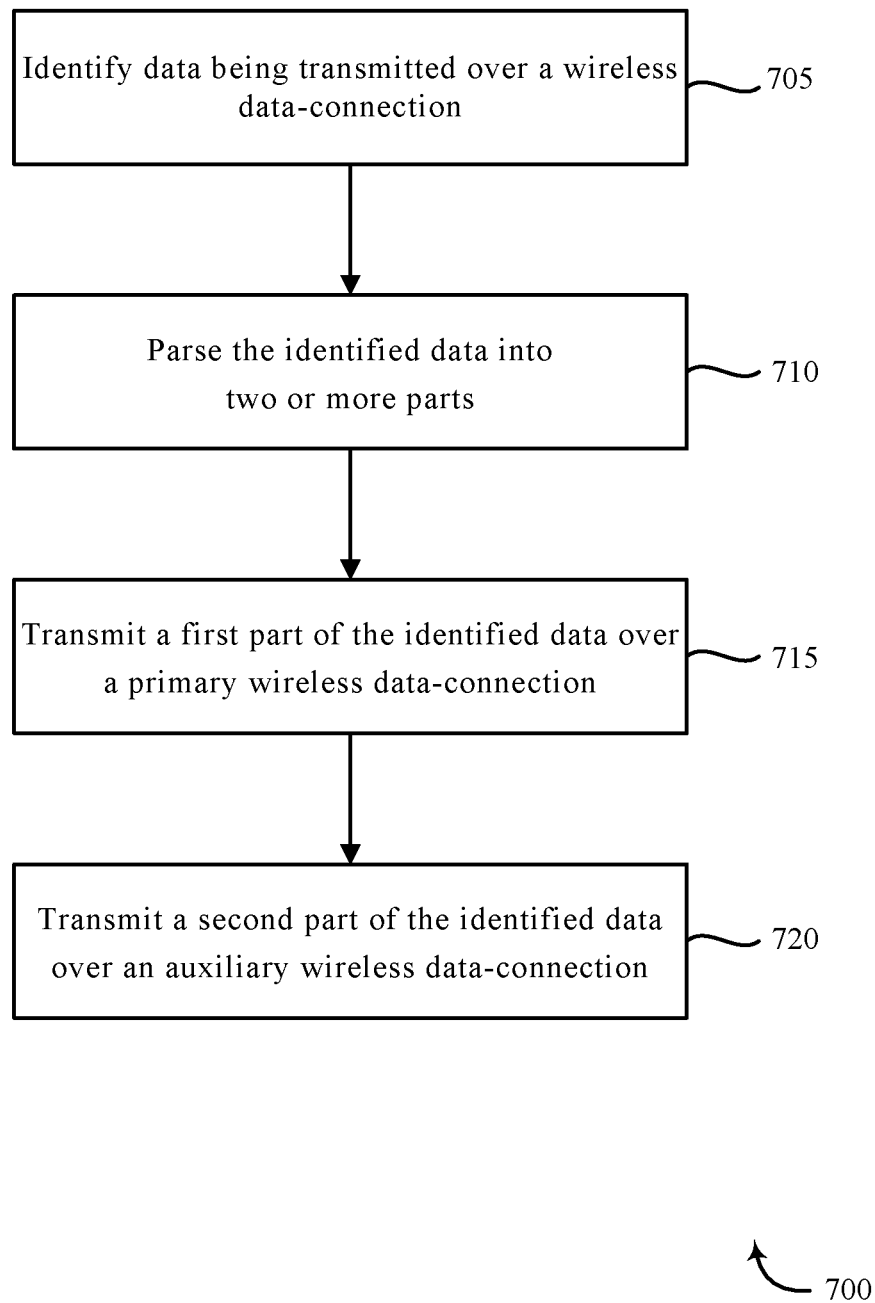
FIG. 7 is a flow chart illustrating an example of a method relating to a security and/or an automation system, in accordance with various aspects of this disclosure.

FIG. 7 is a flow chart illustrating an example of a method 700 for aggregating data over multiple data-connections, in accordance with various aspects of the present disclosure. For clarity, the method 700 is described below with reference to aspects of one or more of the transfer module 215 described with reference to FIGS. 2, 3, and/or 4. In some examples, an apparatus (e.g. apparatus 205) may execute one or more sets of codes to control the functional elements to perform the functions described below. Additionally or alternatively, the apparatus may perform one or more of the functions described below using special-purpose hardware.

At block 705, the method may include identifying data being transmitted over a wireless data-connection. The data may be an individual file, a group of files, generic data and/or the like. The file may be transferred between two locations. The locations may comprise a business, home location, a server, a network, and the like. For example, the data may be transferred between a home location and a server, between two servers, between two businesses, or the like. The data may originate from a primary location and may be attempted to be transmitted over a primary wireless data-connection. The data may be of a size such that it exceeds a capacity of the primary wireless data-connection.

The operation(s) at block 705 may be performed using the identification module 305 described with reference to FIG. 3.

At block 710, the method may include parsing the data into two or more parts. For example, the identified data may exceed the bandwidth capacity of the primary data connection. Dividing the data into two or more pieces may result in smaller files or pieces of data which may be transmitted faster. The pieces of data may be equivalent in size. For example, the data may be halved if transmitting over two connections, trifurcated if transmitting over three lines, and the like. In other embodiments, the data may be parsed into non-equivalent pieces. For example, a first piece may be larger than a second piece, or multiple pieces may be of varying sizes depending upon the availability of auxiliary network bandwidths.

The operation(s) at block 710 may be performed using the parsing module 310 described with reference to FIG. 3.

At block 715, the method may include transmitting a first part of the identified data over a primary wireless data-connection. The primary wireless data-connection may connect the primary location and a network. The primary wireless-data connection may additionally or alternatively connect the primary location and a server. The identified data may be transmitted between the network and the system, between the server and the system, or any other known combination. In some embodiments, the data may be sent to another location by means of the server. The first part of the identified data may consume a large portion of the bandwidth on the primary wireless data-connection. In some embodiments, the data may consume any available bandwidth on the primary connection.

At block 720, the method may include transmitting a second part of the identified data over an auxiliary wireless data-connection. The auxiliary wireless data-connection may be connected to the primary wireless data-connection via a mesh network. The mesh network may comprise wireless technology. The second part of the identified file may not consume the entire bandwidth of the auxiliary connection. Rather, the second piece of data may reduce the size of the overall data enough to allow for an effective transfer of the information over a wireless data-connection. In some embodiments, additional parsed pieces of data may continue to be transferred to auxiliary wireless data-connections via the wireless mesh network.

The operation(s) at blocks 715 and 720 may be performed using the transmit module 315 described with reference to FIG. 3.

Thus, the method 700 may provide for transfer of data over multiple data-connections. It should be noted that the method 700 is just one implementation and that the operations of the method 700 may be rearranged or otherwise modified such that other implementations are possible.

Figure 8:
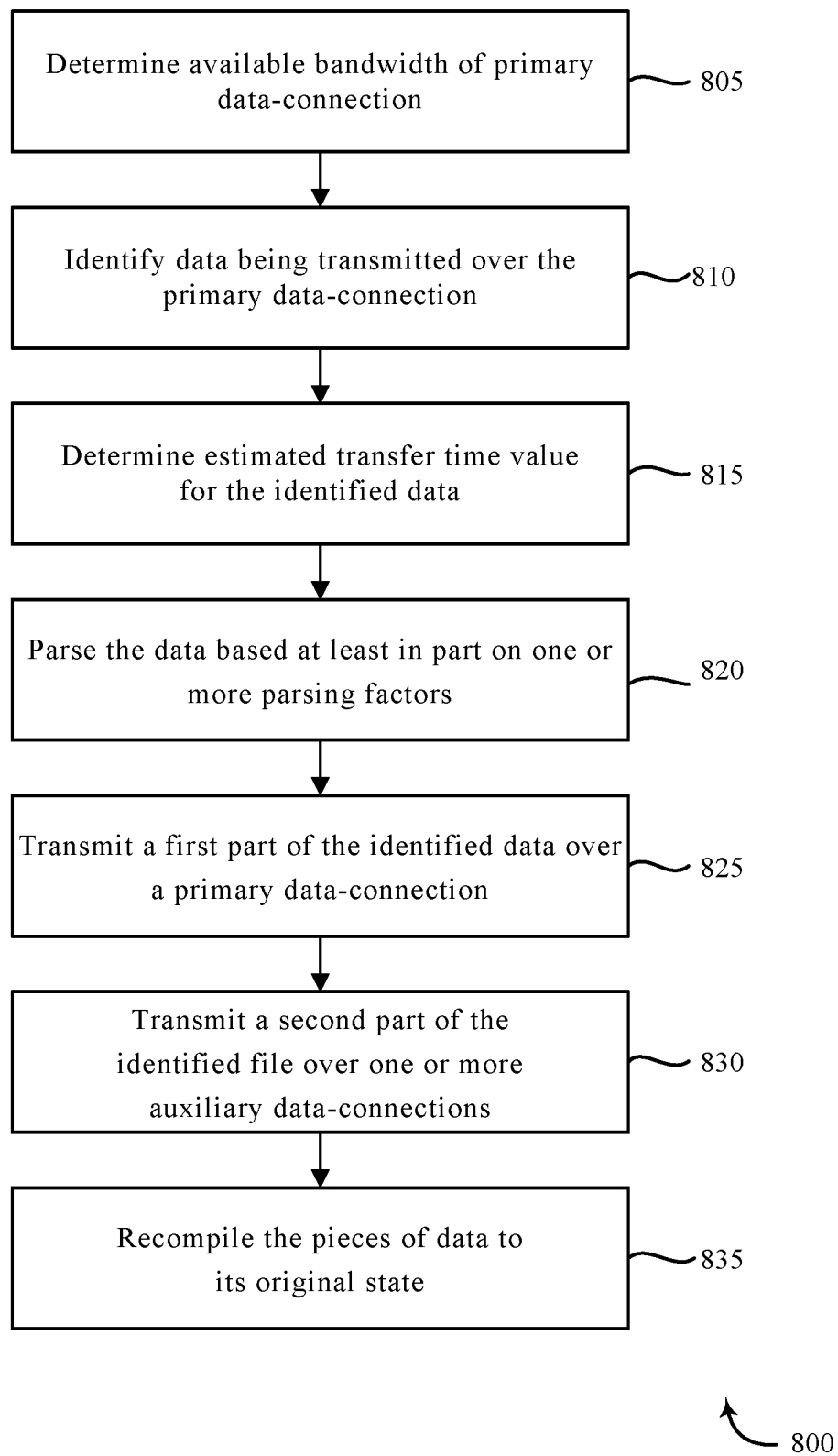
FIG. 8 is a flow chart illustrating an example of a method relating to a security and/or an automation system, in accordance with various aspects of this disclosure.

FIG. 8 is a flow chart illustrating an example of a method 800 for aggregating data over multiple data-connections, in accordance with various aspects of the present disclosure. For clarity, the method 800 is described below with reference to aspects of one or more of the transfer module 215 described with reference to FIGS. 2, 3, and/or 4. In some examples, an apparatus (e.g. apparatus 205) may execute one or more sets of codes to control the functional elements to perform the functions described below. Additionally or alternatively, the apparatus may perform one or more of the functions described below using special-purpose hardware.

At block 805, the method may include determining available bandwidth of a primary data-connection. The primary data-connection may be wired and/or wireless. The primary data-connection may comprise one of a telephone line, Ethernet, coaxial cable, wireless personal area networks, wireless local area network, wireless mesh network, wireless metropolitan area networks, wireless wide area networks, cellular networks, mobile networks, global area network, space network, and the like. Depending upon the type of connection, the speed of the connection purchased, the servicing company, among other factors, the total bandwidth capability and data transfer speed for each data-connection may differ. Additionally, the bandwidth availability may differ based on other data being transferred across the primary data-connection. For example, if a user is transferring numerous pieces of data, the bandwidth capability may change based on the amount of bandwidth consumed by data transfer. The bandwidth availability amount may be determined by subtracting an amount of current data traffic from a total capability of the connection. Therefore, a bandwidth capability for the primary connection may be determined for each individual connection. Additional calculations may also need to occur.

At block 810, the method may include identifying data to be transmitted over the primary data-connection. Identifying the data may comprise identifying a quantity of data, a type, or kind of data, a size of the data, and the like. At block 815, the method may include determining an estimated transfer time value for the identified data. The estimated transfer time value may be calculated by dividing the size of the data by the bandwidth availability of the primary data-connection. The quotient may result in an estimated transfer time value in seconds. In some embodiments, other calculations may be necessary to determine an estimated transfer time value.

The operation(s) at blocks 805, 810, and/or 815 may be performed using the identification module 305 described with reference to FIG. 3.

At block 820, the method may include parsing the data based at least in part on one or more parsing factors. The parsing factors may comprise one of a size of the identified data, an estimated transfer time value, and the availability of auxiliary connections, type of data, and the like. For example, the system may have a predetermined data size which may automatically parse the data. For example, total data size over 4 megabytes. In other embodiments, the total data size may vary based upon user and the user's connection type. For example, a user with a dial-up, telephonic internet connection may have a smaller predetermined data size than a user with an Ethernet connection.

The estimated transfer time value may also result in a parsing of the data. For example, the estimated transfer time value may be greater than a predetermined value of maximum allowable transfer time. The predetermined maximum allowable transfer time value may be based upon a system default, a potential timeout, or latency of connectivity, a user preset, and the like. For example, the system default may be an estimated transfer time value of approximately 60 seconds. The system default may be based on system capability, or on user feedback of desirable transfer time.

The type of data may also be a parsing factor. For example, some types of data may not be desirable to parse. For example, streaming movie content may be difficult to effectively parse, transfer over multiple connections, and then recompile for an acceptable or desirable viewing experience. In other embodiments, other types of data may be transferred much quicker if parsed and transferred over multiple data-connections. For example, still images, software packages, full movie files, music files, and the like may all be large in size but easily parsed, transferred, and recompiled.

The potential for latency, lagging, or time-out may also be a parsing factor. For example, the connection may have multiple pieces of data in queue to transfer and the size of the data may cause a delay in the transferring of data. The data may also be too large to effectively transfer over the available bandwidth and may cause the connection to timeout. Connection timeout may occur when the desired transfer of a file is not completed within a predetermined time frame.

The operation(s) at blocks 820 may be performed using the parsing module 310 described with reference to FIG. 3.

At block 825, the method may include transmitting a first part of the identified data over a primary data-connection. At block 830, the method may include transmitting a second part of the identified data over one or more auxiliary data-connections. The primary and auxiliary data-connections may be integrated over a mesh network. In some embodiments, more than one piece of data may be transferred across a data-connection. In those embodiments, the data sent from a primary location may be prioritized over data being transmitted from a secondary location. For example, a piece of data may be transferred across an auxiliary data-connection. However the auxiliary data-connection may be a second user's primary data-connection. If the second user is attempting to transmit data across that particular data-connection, the second user's data may be prioritized. This may comprise delaying the transmission of the piece of data, or redirecting the second piece of data to a second auxiliary data-connection.

The operation(s) at blocks 825 and 830 may be performed using the transmit module 315 described with reference to FIG. 3.

At block 835, the method may include recompiling the pieces of data to its original state. For example, the different pieces of parsed data may be reconstituted into its state prior to being parsed. A series of instructions or a recompilation file may be transferred either in conjunction with or separately from the parse data. The instructions may contain a series of directions on how to recompile the data. The data may be recompiled prior to presenting the data to the end user. For example, the recompilation of the data may occur as a hidden action from the user such that the user is unaware that the parsing and recompiling is taking place The operation(s) at blocks 835 may be performed using the aggregation module 320 described with reference to FIG. 3.

Thus, the method 800 may provide for transfer of data over multiple data-connections. It should be noted that the method 800 is just one implementation and that the operations of the method 800 may be rearranged or otherwise modified such that other implementations are possible.

In some examples, aspects from two or more of the methods 600, 700, 800 may be combined and/or separated. It should be noted that the methods 600, 700, 800 are just example implementations, and that the operations of the methods 600, 700, 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   identifying data for transmitting over a data-connection;
   determining an availability of a primary data-connection and an availability of a first auxiliary data-connection;
   parsing the identified data into two or more parts based at least in part on determining the availability of the primary data-connection and the availability of the first auxiliary data-connection;
   transmitting a first part of the identified data over the primary data-connection; and
   transmitting a second part of the identified data over the first auxiliary data-connection.

2. The method of claim 1, further comprising:
   transmitting a code associated with aggregating the identified data, the code further associated with the first part of the identified data and the second part of the identified data.

3. The method of claim 2, wherein the code is at least one of impregnated into either the first part of the identified data or the second part of the identified data or transmitted as a separate file.

4. The method of claim 1, further comprising:
   redirecting the second part of the identified data over a second auxiliary data-connection.

5. The method of claim 4, wherein the redirecting is based at least in part on at least one of an interruption of the transmitting the second part of the identified data over the first auxiliary data-connection or a consumption of bandwidth associated with the first auxiliary data-connection.

6. The method of claim 1, further comprising:
determining an available bandwidth of the first auxiliary data-connection, wherein the transmitting the second part of the identified data over the first auxiliary data-connection is based at least in part on the determining.

7. The method of claim 6, further comprising:
selecting, based on least in part on the determined available bandwidth of the first auxiliary data-connection, a size of the second part of the identified data.

8. method of claim 1, wherein a size of the second part of the identified data is different from a size of the first part of the identified data.

9. The method of claim 1 further comprising:
transmitting a third part of the identified data over a second auxiliary data-connection; wherein at least one of the primary data-connection, the first auxiliary data-connection, and the second auxiliary data-connection is a wired data-connection.

10. The method of claim 1, wherein the first part of the identified data and the second part of the identified data are transmitted to at least one of a network or a server for the server to retransmit.

11. The method of claim 1, wherein the first part of the identified data consumes less than all available bandwidth of the primary data-connection.

12. The method of claim 1, further comprising:
determining whether a size of the identified data exceeds a predetermined threshold data size, wherein the parsing is based at least in part on the determining.

13. The method of claim 12, wherein the predetermined threshold data size is based at least in part on a user connection type.

14. The method of claim 1, wherein the parsing is based at least in part on a data type.

15. An apparatus for security and/or automation systems, comprising:
a processor;
memory in electronic communication with the processor; and
instructions stored in the memory, the instructions being executable by the processor to:
identify data for transmitting over a wired data-connection;
determine an availability of a primary data-connection and an availability of a first auxiliary data-connection;
parse the identified data into two or more parts based at least in part on determining the availability of the primary data-connection and the availability of the first auxiliary data-connection;
transmit a first part of the identified data over the primary data-connection; and
transmit a second part of the identified data over the first auxiliary data-connection.

16. The apparatus of claim 15, wherein the instructions are further executable by the processor to:
transmit a code associated with aggregating the identified data, the code further associated with the first part of the identified data and the second part of the identified data.

17. The apparatus of claim 15, wherein the instructions are further executable by the processor to:
transmit a code associated with aggregating the identified data, the code further associated with the first part of the identified data and the second part of the identified data.

18. The apparatus of claim 15 wherein the instructions are further executable by the processor to:
transmit a third part of the identified data over a second auxiliary data-connection; wherein at least one of the primary data-connection, the first auxiliary data-connection, and the second auxiliary data-connection is a wired data-connection.

19. The apparatus of claim 15, wherein the instructions are further executable by the processor to:
determine whether a size of the identified data exceeds a predetermined threshold data size, wherein the parsing is based at least in part on the determining.

20. A non-transitory computer-readable medium storing computer-executable code, the code executable by a processor to:
identify data for transmitting over a wired data-connection;
determine an availability of a primary data-connection and an availability of a first auxiliary data-connection;
parse the identified data into two or more parts based at least in part on determining the availability of the primary data-connection and the availability of the first auxiliary data-connection;
transmit a first part of the identified data over the primary data-connection; and
transmit a second part of the identified data over the first auxiliary data-connection.

* * * * *